(12) United States Patent
Pilchowski

(10) Patent No.: US 6,418,829 B1
(45) Date of Patent: Jul. 16, 2002

(54) POWER TOOL SAFETY DEVICE

(76) Inventor: Thomas Stanley Pilchowski, 4862 Dove Cir., La Palma, CA (US) 90623

( * ) Notice: Subject to any disclaimer, the term of this patent is extended or adjusted under 35 U.S.C. 154(b) by 0 days.

(21) Appl. No.: 08/238,948

(22) Filed: May 6, 1994

(51) Int. Cl.[7] .............................. B26D 7/24; B27B 5/22; B27B 5/38
(52) U.S. Cl. .......................... 83/397; 83/58; 83/477.2; 83/DIG. 1
(58) Field of Search .............................. 83/DIG. 1, 397, 83/477.2, 478, 58, 62, 522.12; 192/123 A, 129 R, 130, 133, 135, 137, 129 A, 125 F

(56) References Cited

U.S. PATENT DOCUMENTS

| | | | |
|---|---|---|---|
| 3,249,134 A | | 5/1966 | Vogl et al. |
| 3,754,493 A | | 8/1973 | Niehaus et al. |
| 3,987,283 A | * | 10/1976 | Moeller ...................... 192/126 |
| 4,033,218 A | * | 7/1977 | Donatelle .................... 83/478 |
| 4,060,160 A | * | 11/1977 | Lieber ......................... 192/134 |
| 4,120,389 A | * | 10/1978 | Erickson ..................... 192/129 |
| 5,168,173 A | * | 12/1992 | Windsor ..................... 192/129 |
| 5,181,447 A | | 1/1993 | Hewitt |

OTHER PUBLICATIONS

Delta International Machinery Corp., Instruction Manual, Part. No. 422–04–651–0024, 1990.

* cited by examiner

*Primary Examiner*—Charles Goodman
(74) *Attorney, Agent, or Firm*—Gregory L. Roth

(57) ABSTRACT

A highly reliable and inexpensive safety device for a power tool having a protective guard over a cutting blade which prevents use of the power tool when the protective guard is not in place. The safety device includes a proximity detector detecting a distance between the guard and a power tool table top and an interlock system that prevents operation of the power tool when a distance less than a predetermined relative proximity is not detected. In the case of a power table saw a pair of magnets are secured to the guard and a pair of reed switches are mounted beneath the table top to be closed when the guard is in place. The interlock system responds to the reed switches by allowing the saw to be started when the switches are both closed and preventing startup when they are not. A key activated bypass circuit allows the saw motor to be started when the guard is not present.

34 Claims, 4 Drawing Sheets

POWER TOOL SAFETY DEVICE

BACKGROUND OF THE INVENTION

Power table saws have been in common use for many years and many accessories have been developed to improve operator safety. Table saws are provided with a blade guard to cover the rotating blade while the saw is in use. However, the guard must be easily removed to facilitate certain special cuts. Often, the operator fails to reinstall the blade guard after the special cut is completed. As a result, many injuries occur each year when saws are operated without the blade guard being properly in place.

Manufacturers have attempted to introduce interlock systems that would detect the presence or absence of the blade guard and allow operation of a saw in the absence of a blade guard only when a special key activation or other interlock override signal has been generated. However, the existence of a dusty, physically rugged environment in the vicinity of the saw blade and the need to accommodate large work pieces have until now rendered such systems unreliable or impractical.

Two examples of blade guard systems are shown in U.S. Pat. No. 3,249,134 issued to Vogl et al. for SAW AND DADO GUARD and U.S. Pat. No. 3,754,493 issued to Niehaus et al. for CIRCULAR SAW BLADE GUARD. The Vogl patent discloses a power saw blade guard that has two independent side panels that adjust relative to the work surface to accommodate the work piece being cut. The entire guard can be easily pivoted away from the blade prior to starting the saw motor.

The Niehaus patent discloses a power saw blade guard that normally rests on the saw table and adjusts to the height of a work piece passing through the saw blade. The Niehaus patent further discloses a guide plate or splitter positioned in line with the saw blade to support the guard and separate a cut work piece after the work piece is passed through the saw blade to prevent the work piece from binding on the blade. When the guide plate is secured in place, the blade guard mounted on the guide plate has a limited swing angle so as to prevent the guard from being tilted back during normal operation. To prevent injuries, this guard, along with its guide plate, must be in place prior to startup and remain in place over the saw blade while the work piece is passing through the saw blade. It is left up to the operator to make sure the guard and the guide plate is in place. The guard and the guide plate can be easily pivoted away, leaving the saw blade exposed while the table saw is running.

Another type of power table saw guard is disclosed in U.S. Pat. No. 5,181,447 to Hewitt. The Hewitt blade guard has a safety power cut-off device that cuts off power to the table saw when the blade guard is pivoted away from the saw blade. This prevents open exposure of the rotating blade to the operator when the guard is tilted away from the blade while the blade is turning. However, this blade guard has several drawbacks. The guard does not self-adjust relative to the working surface and does not stay in contact with the work piece as it is being cut. The guard must be manually adjusted to a fixed height above the table that is sufficient to cut a work piece prior to cutting a work piece. This means that the blade remains exposed to the extent of the height of the work piece. Further once an operator cuts a thick work piece it is likely that a subsequent, thinner work piece will be cut without adjusting the blade guard downward. This will leave more exposure to the blade than necessary during the subsequent cut. In addition, the guard does not adequately enclose the blade so as to protect an operator from flying wood fragments and broken saw teeth. The guard must be mounted on a cantilevered arm that limits the width of a work piece that can be cut. However, the guard does have an interlock circuit and a keylock override that prevents pivoting of the guard completely away from the saw blade unless the keylock override is activated.

The Occupational Safety and Health Administration (OSHA) has established rules specifically for table saws. They require that each circular hand-fed ripsaw be guarded by a hood that completely encloses the portion of the saw above the material being cut. The hood and mounting must allow the hood to automatically adjust itself to the thickness of the material being cut. This same regulation is required for the table saw as well.

There has been a long recognized need to implement a safety interlock circuit for use with this type of self adjusting, continuous contact blade guard. However, the harsh environment in the vicinity of a saw blade has prevented the practical realization of a blade guard electromechanical interlock system.

SUMMARY OF THE INVENTION

A low cost, highly reliable power tool safety device in accordance with the invention includes a proximity detector detecting the relative proximity between a power cutting tool guard and a table top and an interlock system that prevents startup of the power tool when the guard is not in place. The safety device may be effectively used with self adjusting, continuous contact power table saw blade guards as well as other types of cutting tool guards.

The proximity detector includes at least one permanent magnet permanently secured to the guard to generate a magnetic field and at least one magnetic field intensity detector which may be a normally open magnetic reed switch disposed on a side of the table opposite the working surface at a detection location opposite to the permanent magnet. This placement keeps all of the wiring, electrical contacts and sensors under the table and away from the saw blade, the dust and the constant vibrations of the blade guard. The sensitivity of each reed switch to a magnetic field is selected to cause each reed switch to close when the guard is properly positioned in guarding relationship to the cutting tool. Each magnetic reed switch has an open state and a closed state and is coupled in series between the electric starting circuit and a power source. Each reed switch detects the predetermined relative proximity by remaining in the open state when the predetermined relative proximity is not detected and switching to the closed state when the predetermined relative proximity is detected. The proximity detector generates an electrical proximity signal indicating whether or not the guard is within the predetermined relative proximity to the working surface, the electrical proximity signal being communicated to the interlock system.

The interlock system prevents use of the power tool when the proximity detector does not detect proximity between the guard and the working surface by placing each magnetic reed switch in series with a motor starter circuit. If the guard is not in place the reed switch opens and prevents energization of the motor starter circuit. Once the motor is started the motor will remain energized even if a thick work piece causes a loss of proximity between the guard and the reed switch.

A key operated bypass switch allows the motor to be started one time without the guard in place to accommodate special cuts or unusual work piece shapes that require operation of the power tool with the guard removed. The requirement for a key assures that unguarded operation can be specially supervised by a teacher or supervisor. An indicator light is illuminated to alert an operator or supervisor that the interlock circuit has been bypassed.

BRIEF DESCRIPTIONS OF THE DRAWINGS

A better understanding of the invention may be had from a consideration of the following Detailed Description taken in conjunction with the accompanying drawings in which.

DETAILED DESCRIPTION OF THE PREFERRED EMBODIMENT

Figure 1:
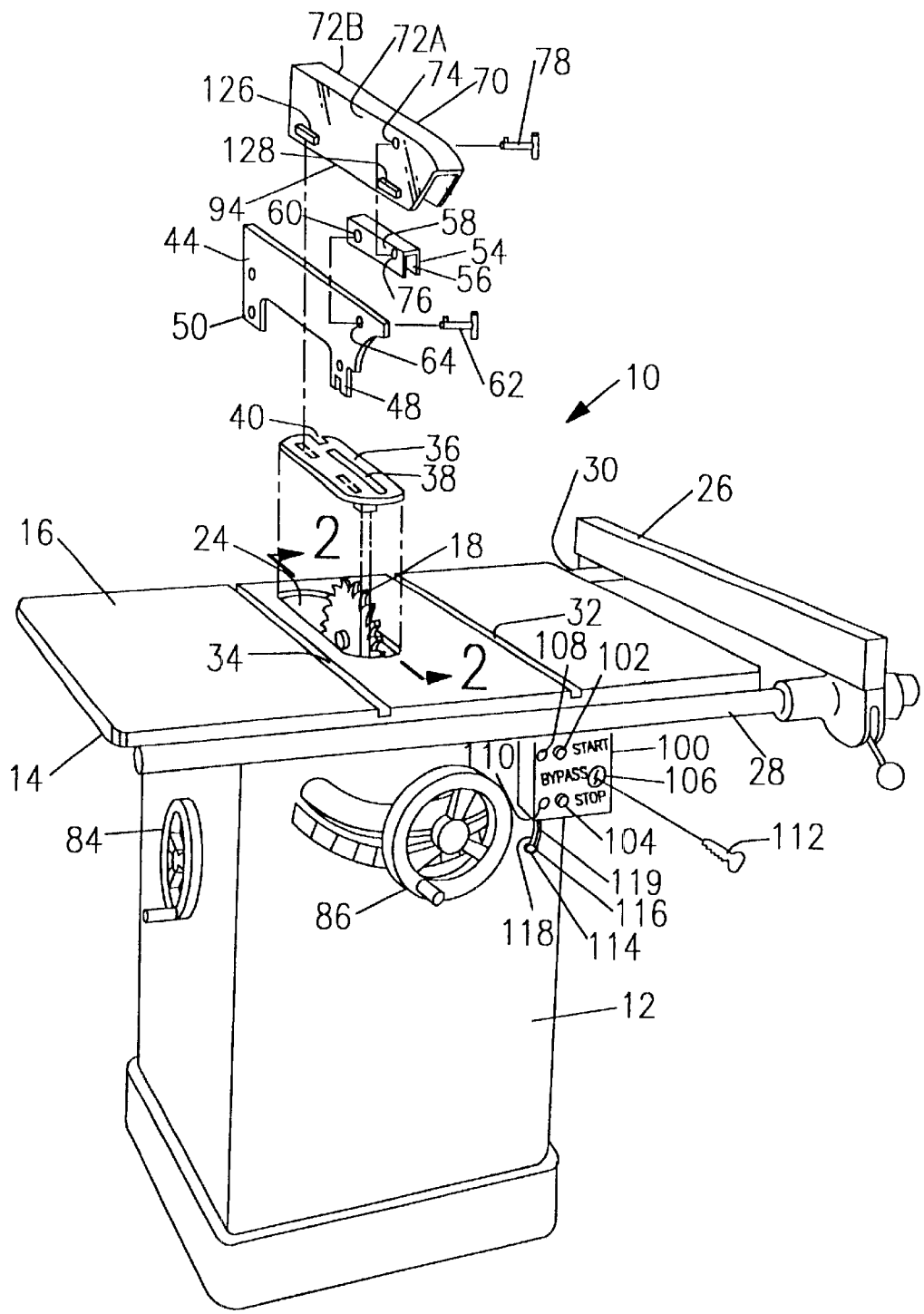
FIG. 1 is a partially exploded perspective view of a power table saw having a power tool safety device according to the present invention.

Referring now to FIG. 1, a power cutting tool and more particularly a power table saw 10 in accordance with the present invention includes a base 12, a table 14 having a top, a generally planar working surface 16 and a cutting blade 18 that extends through a blade aperture 24 in the table 14.

A rip fence 26 is movable on tubular tracks 28, 30 and longitudinally extending slots 32, 34 are provided in the working surface 16 to receive a cross cut guide which is not shown. An insert 36 is disposed within aperture 24 with a top surface parallel to and substantially flush with the working surface 16. Insert 36 has a first, centrally located, longitudinally extending slot 38 which receives blade 18 and a second longitudinally extending slot 40 disposed rearward of slot 38 in alignment with slot 38.

Figure 2:
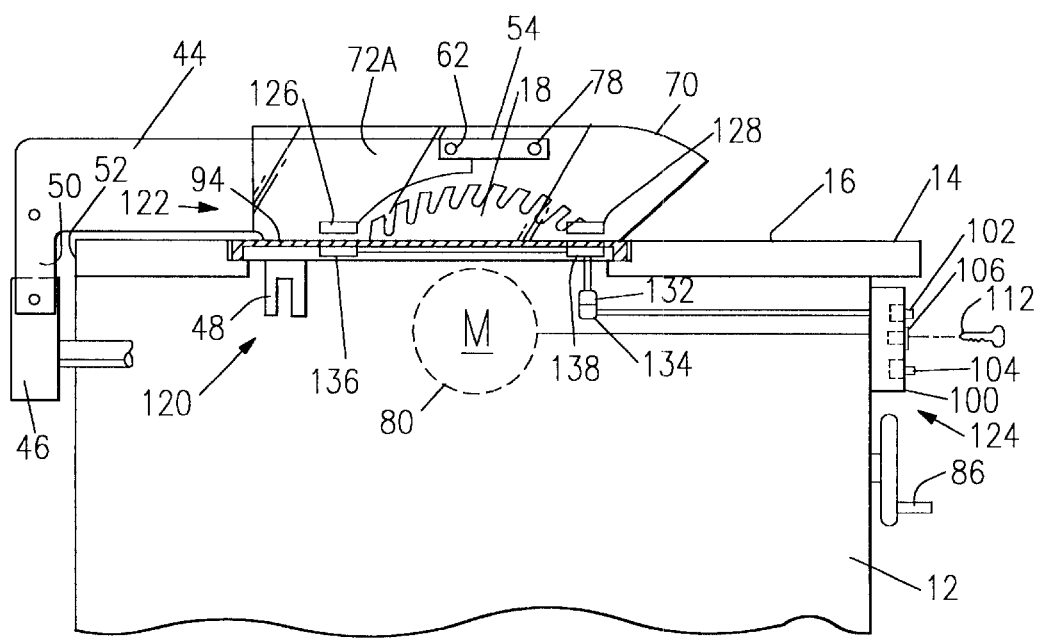
FIG. 2 is a fragmentary side section view of the table saw shown in FIG. 1 taken along line 2—2.

Making further reference to FIG. 2, a splitter 44 has a slotted front mounting leg 48 and an apertured rear 20 mounting leg 50. The front mounting leg 48 extends through rear slot 40 in insert 36 where it may be removably secured by a bolt to a rotatable arbor 46 (only a small portion of which is shown). The rear mounting leg 50 extends downward below a rear edge 52 of working surface 16 where a bolt may removably secure the rear leg 50 to a portion of the arbor 46 that extends through a rear wall of base 12.

A U-shaped longitudinally extending pivot link 54 is disposed over the top of splitter 44 with a channel 56 receiving the top edge of splitter 44. The sidewalls 58 of link 54 each have a rear aperture 60 that is rotatably secured by a pin 62 to an aperture 64 in the splitter 44 located near the top front portion thereof. A pair of spring loaded pawls (not shown) or anti kickback fingers also extend downwardly from pin 62 on each side of splitter 44 and link 54. These fingers have been omitted for clarity but are shown in U.S. Pat. No. 3,754,493 to Niehaus et al., which is hereby incorporated by reference to illustrate one embodiment of splitter 44 and guard 70.

A generally U-shape saw blade guard 70 has a pair of opposed side walls 72A, 72B which each have an aperture 74 extending there through near a centrally located upper portion thereof. The link 54 has a pair of apertures 76 near the front thereof and a pin 78 passes through the apertures 74 and 76 to rotatably secure the blade guard 70 to the link 54 and indirectly through link 54 to the 20 splitter 44.

A motor M 80 and the cutting blade 18 are both mounted on the rotatable arbor 46 within the base 12 (mounting not shown). A pulley and belt arrangement (not shown) couples the blade 18 to be rotationally driven by motor 80. The arbor 46 and the blade 18 and motor 80 mounted on arbor 46 are both vertically and rotationally adjustable to select the height and angle relative to the vertical at which the blade 18 extends through the table 14. A hand crank 84 controls the vertical height of arbor 46 including blade 18 while a hand crank 86 rotates a pinion relative to a rack (not shown) to select a pivot angle.

Figure 3:
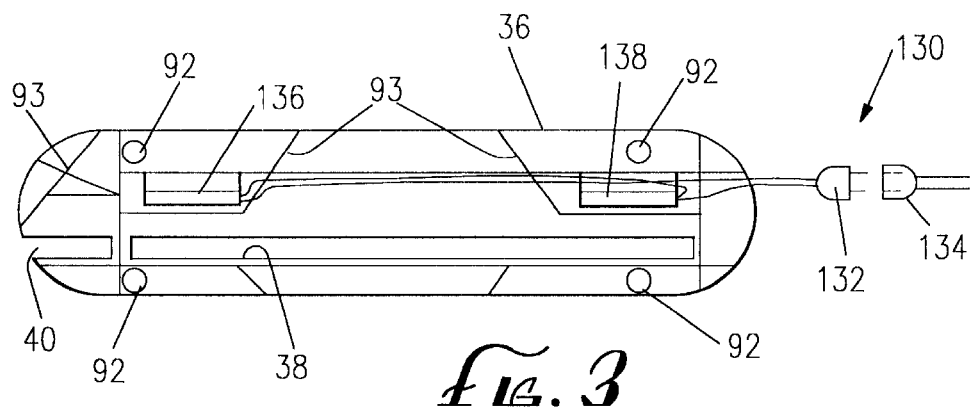
FIG. 3 is a bottom view of an insert used in the table saw shown in FIG. 1.
Figure 4:
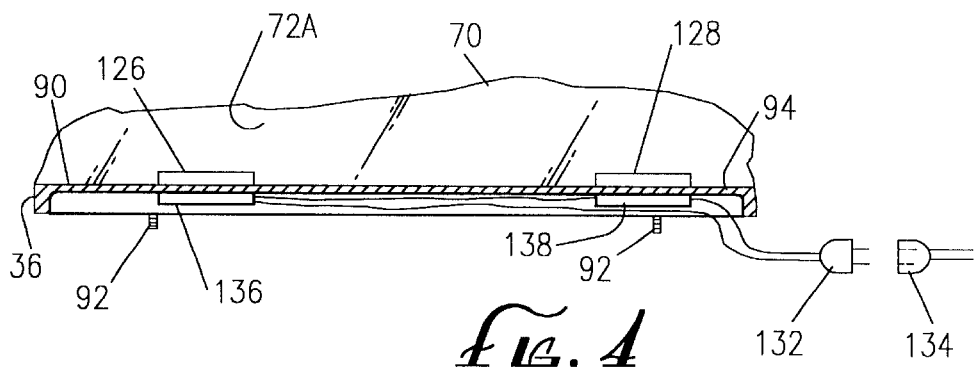
FIG. 4 is an enlarged fragmentary section view of a guard and insert shown in FIG. 2.
Figure 5:
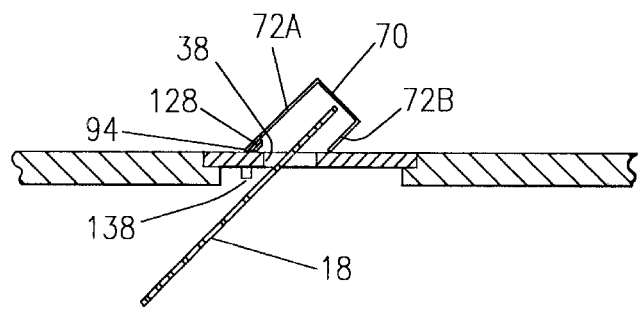
FIG. 5 is a simplified front section view of a guard from the power table saw shown in FIG. 1, with the blade and guard tilted at an angle relative to a table top.

Making further reference to FIGS. 3, 4 and 5, the insert 36 has a top insert working surface 90 that should be substantially flush with the table working surface 16 when the insert 36 is in place within aperture 24. Four threaded screws 92 extend downward from insert 36 to provide a precise height adjustment. A pattern of reinforcement ribs 93 is placed on the bottom of insert 36 to increase the strength of insert 36. The insert is made of a low permitivity material such as pot metal or aluminum that will not interfere with a magnetic field passing through insert 36.

As best seen in FIG. 5, guard 70, splitter 44 (not shown in FIG. 5) and saw blade 18 which are all mounted on the arbor 46 may be tilted or rotated from a vertical orientation in a clockwise direction as viewed from the front. The arbor assembly is shown to be rotated to an angle of about 45° in FIG. 5. The guard 70 has a right hand side panel 72B that is about ½ inch shorter than the left hand side panel 72A. This allows a bottom edge 94 of side panel 72A to remain in contact with working surface 16 as the arbor assembly including blade 18 is rotated clockwise to about 45°.

A control panel 100 is suspended from the bottom side of table 14 and contains the low voltage control circuits for saw 10. A panel containing high voltage, high current motor control circuits is mounted on the back side of saw 10 and is not shown. The control panel 100 has mounted thereon a START switch 102, a STOP switch 104, a key switch 106, a READY indicator light 108 and a bypass mode indicator light 110. The key switch 106 is responsive to a key 112 and has two stable positions, on and off. In addition, the key switch has a spring recoil bypass position similar to the start position of an automobile ignition lock that returns the key switch to the on position from the bypass position. Also, the key 112 is removable when the key switch 106 is in the on or off position. A hole 114 and grommet 116 provide passage of two cables 118, 119 carrying electrical signals through the front panel of base 12 to and from control panel 100.

While all of the mechanical features of the power table saw 10 have not been described in detail, it will be appreciated that these features are conventional. A commercially available 1990 10" Tilting Arbor Unisaw manufactured by Delta International Machinery Corp. of Memphis, Tennessee is representative of the conventional mechanical and electromechanical structure of the power table saw 10. This table saw is described in an Instruction Manual dated Feb. 26, 1990 for Part No. 422-04-651-0024.

A safety device 120 shown in FIG. 2 provides an interlock which assures that the power table saw 10 cannot be operated unless either the guard 70 is properly in place at the start of operation or a person of supervisory authority uses key 112 to actuate a bypass condition with key switch 106. The safety device 120 includes a proximity detector 122 and an interlock system 124 that is disposed within control panel 100.

The proximity detector 122 includes a pair of permanent magnets 126, 128 mounted on the left side 72A near the bottom edge 94 thereof and a pair of magnetic reed switches 136, 138 disposed on the bottom side of insert 36 in opposed, mating relationship to permanent magnets 126, 128.

In the illustrated embodiment, the permanent magnets 126, 128 are mounted slightly above the bottom edge 94 of side panel 72A so that as the blade and guard 70 are tilted clockwise to the right, the permanent magnets 126, 128 will not engage or interfere with the passage of a work piece beneath the bottom edge 94 of guard 70. It is preferred, but not essential, that the magnet 126 be mounted at a location rearward of blade 18 and that magnet 128 be mounted at a location forward of blade 18 so that if the guard 70 is pushed sideways into the blade 18, the magnets 126, 128 will not make contact with blade 18. In a high volume production model of the safety device 120, it is anticipated that the permanent magnets 126, 128 would be permanently molded into the left side panel 72A of guard 70 near the bottom edge 94 with the bottom edge 94 being contoured so as to avoid interference with the passage of a work piece beneath the bottom edge 94 regardless of the tilt angle of the blade 18 and guard 70. The permanent magnet 126 is positioned near the rear of saw blade 18 while permanent magnet 128 is positioned near the front of the saw blade 18. The use of two permanent magnets is not essential but makes it more difficult for an operator to defeat the safety device 120.

The reed switches 136, 138 may be any suitable reed switch which is normally open but which is closed in the presence of a magnetic field of a strength that is produced by a permanent magnet 126 or 128 when the permanent magnet is approximately one inch away. By way of example, the magnets 126, 128 and reed switches 136, 138 are packaged in mating pairs by Safe House and sold by the Radio Shack division of Tandy Corp. under Catalog No. 49-497. Other suitable implementations of a proximity detector could be used as well. The reed switches 136, 138 may be secured by glue, adhesive or other suitable means to the bottom side of insert 36 in opposed relationship to magnets 126, 128. The reed switches 136, 138 are connected in series with each other and through a plug connector 130 having a plug 132 and a receptacle 134 to the interlock system 124. The plug connector 130 is preferably located near the insert 36 so that insert 36 may be easily removed from aperture 24.

Other guards exist that have side panels that are separately moveable relative to the working surface such as the Uniguard described in the aforementioned instruction manual for the Delta 10" Tilting Arbor Saw as part number 34-885. The present invention can be easily adapted to this adjustable guard by installing one or more magnets to the bottom edge of one or preferably both of the adjustable side panels. A reed switch should be installed beneath the working surface 16 in opposed relationship to each magnet in the same manner as described above so that the reed switches will close when the bottom edges of the Uniguard are at a predetermined distance from the working surface. Other blade protective guards can also be fitted with the present invention so long as a portion of the guard contacts the working surface of the table saw prior to starting.

Figure 6:
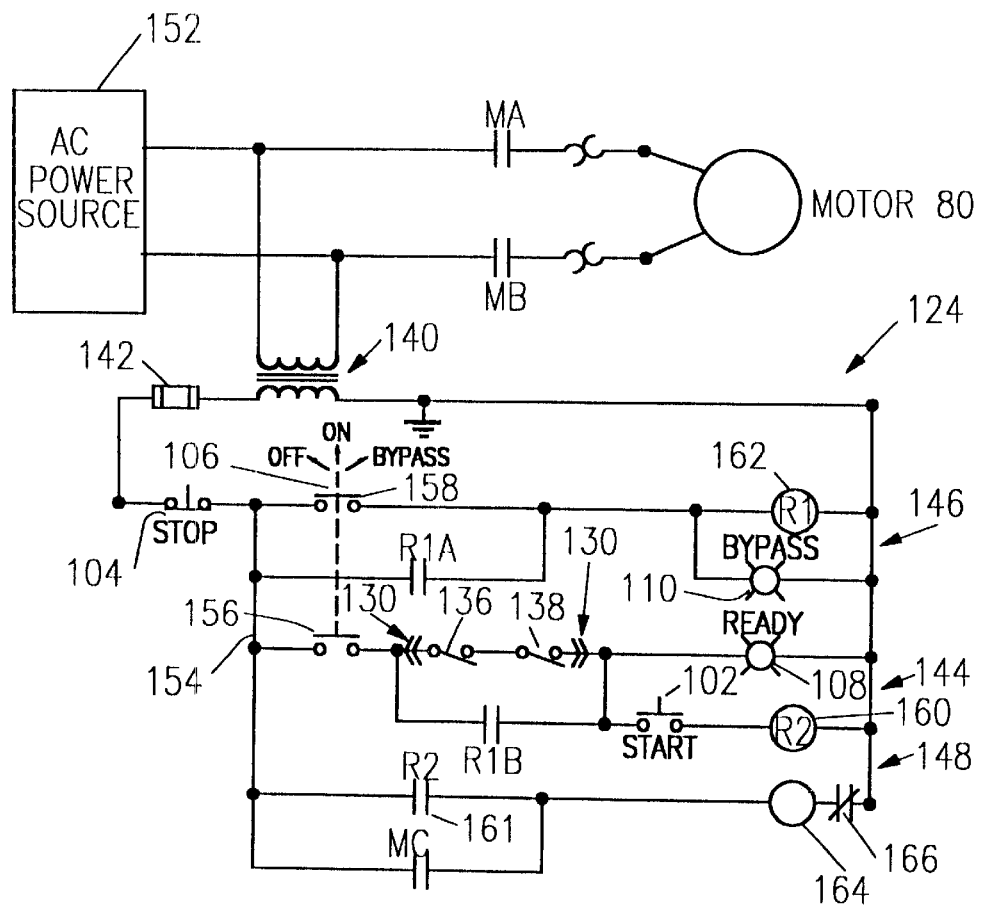
FIG. 6 is an electrical schematic representation of a safety interlock system for the power table saw shown in FIG. 1.
Figure 7:
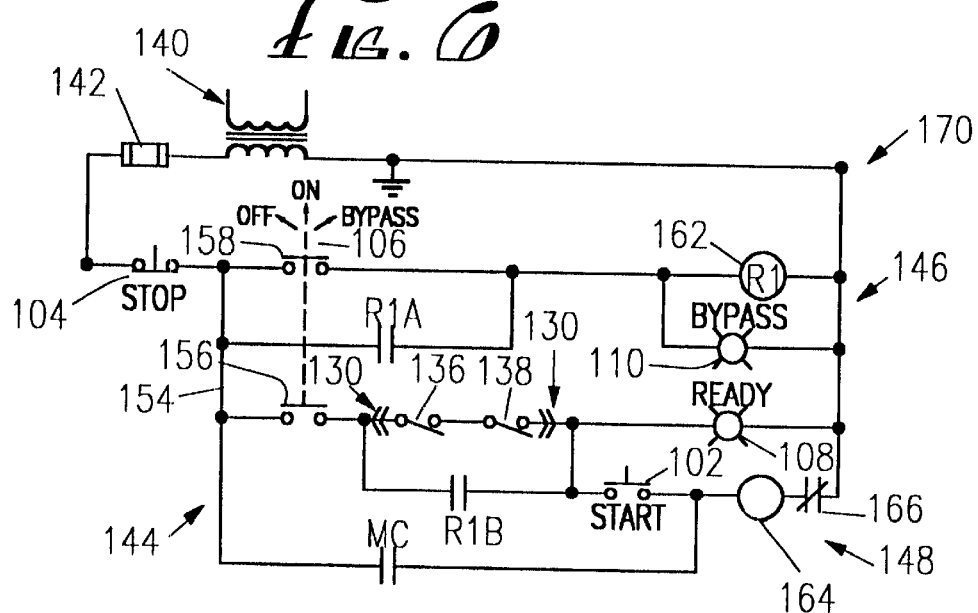
FIG. 7 is an electrical schematic representation of an alternative embodiment of a safety interlock system for the power table saw shown in FIG. 1.

Referring now to FIG. 6, the interlock system 124 is coupled to motor 80 and includes a transformer 140, a fuse 142, a start circuit 144, a bypass circuit 146, and a run circuit 148.

Motor 80 is shown as a single phase AC motor although the motor is also available in commercial saws as a three phase AC motor. Each power terminal of the motor 80 is coupled through a motor relay contact MA,MB to an AC power source 152. The primary winding of transformer 140 is coupled across power terminals of motor 80 while the secondary winding provides approximately 24 volts AC through fuse 142 and stop switch 104 to a power rail 154.

The key switch 106 includes an on contact 156 which is open when the key switch is in the off or bypass position and closed when the key switch is in the on position. Key switch 106 also includes a second bypass contact 158 which is normally open and is closed only when the key switch is in the temporary bypass position. The start circuit 144 includes the on contact 156 having one terminal contacted to power rail 154 and the second terminal coupled to a first side of the parallel combination of a relay contact R1B of R1 relay coil 162 and the series combination of reed relay proximity switches 136, 138 which are connected to interlock system 124 by plug connector 130. A second side of relay contact R1B and switches 136, 138 are in turn connected to the first side of the parallel combination of a READY indicator light 108 and to the series combination of start switch 102 and an R2 relay coil 160, having a normally open contact 161. An opposite second side of this parallel combination is connected to ground that is connected to the secondary coil of transformer 140.

The bypass circuit 146 includes the parallel combination of the bypass contact 158 of key switch 106 and a relay contact R1A of R1 relay coil 162 having a first side connected to the power rail 154 and an opposite second side connected to a first side of the parallel combination of R1 relay coil 162 and a bypass indicator lamp 110. A second side of relay coil R1 and bypass lamp 110 are connected to ground.

Run circuit 148 includes the parallel combination of an R2 contact 161 from R2 relay coil 160 and an MC contact from a motor relay coil 164. Relay contacts R2 and MC are connected between the power rail 154 and the motor relay coil 164 which in turn is connected through an overload protector 166 to ground.

In operation the normally closed stop switch 104 normally provides power to power rail 154. If key switch 106 is in the off position, contact 156 is open, relay R2 is open and no power can be provided to the motor relay coil 164.

However, if key switch 106 is turned to the on position, contact 156 closes and power is provided to the parallel combination of proximity switches 136, 138 and relay contact R1B. If the guard 70 is properly in place, proximity switches 136, 138 are closed and power is provided to start switch 102 and to the READY indicator lamp 108. Upon actuation of the normally open start switch 102, power is provided to the R2 relay coil 160. This in turn closes contact R2 and makes power available to the motor relay coil 164. As soon as power is available to the motor relay coil 164 motor relay contacts MA and MB close to apply energy to motor 80 and start the rotation of saw blade 18. At the same time, relay contact MC closes to assure a continuation of power to the motor relay coil 164 after the start switch 102 is released. Contact MC also maintains operational energization of the motor relay coil 164 even if the passage of a work piece beneath the guard 70 raises guard 70 sufficiently above the table top 16 so that proximity between the magnets 126, 128 and mating proximity switches 136, 138 respectively is lost causing reed switches 136 or 138 to become open. Consequently, the safety device 120 assures that the guard 70 is in place when the saw 10 is started, but does not interfere with continued operation of the saw thereafter.

It will be appreciated that in the interlock system 124 shown in FIG. 6 the R2 relay coil 160 essentially serves as a power amplifier so that the full current required to energize the motor relay coil 164 need not pass through the proximity switches 136, 138.

In an alternate embodiment, interlock system 170 is essentially the same as interlock system 124 except that the proximity switches 136, 138 are capable of carrying sufficient current to directly energize the motor relay coil 164 to render unnecessary the power amplifier R2 relay 160. In this case the motor relay coil 164 is connected in the same location as the coil of R2 relay 160 in the interlock system 124 and motor relay contact MC is connected in parallel between the power rail 154 and the motor relay coil 164.

The interlock systems 124, 170 have been shown to be implemented with electro-mechanical relays for a developmental embodiment of the invention. However, it will be appreciated that for a production model of the invention it may be desirable to implement some or all of the interlock circuit functions with one or more solid state components.

In the event that it is necessary to operate the power saw 10 without the guard 70 in place, the guard can be removed while the saw is in an off or power down condition. Upon removal of the guard the saw can be started by moving the key switch 106 to the bypass position to close contacts 158 and subsequently actuating the start switch 102. The key switch then springs back to the on position holding contact 156 closed. The closure of contact 158 applies power to the bypass relay coil R1 162 which in turn causes the closure of relay contacts R1A and R1B. The closure of contact R1A applies power to bypass lamp 110 and R1 bypass relay coil 162 even after the key switch 106 is released from the bypass position. Once the R1 bypass relay coil 162 is actuated, the start button 102 may be actuated after key is returned to on position closing contact 156. Once the start switch 102 is actuated, power is applied to either relay coil R2 160 and motor relay coil 164 or directly to motor relay coil 164. In any event the start switch initiates the operation of motor 80.

Once the motor 80 is energized by interlock circuit 124 or 170, the motor remains operational until actuation of stop switch 104 temporarily terminates the application of power to power rail 154. This in turn de-energizes all of the control relays and precludes a restart until the start switch 102 is actuated while either the proximity switches 136, 138 are closed or after the key switch has again been turned to the bypass position to enable bypass operation.

Thus, a supervisor having possession of the key 112 for key switch 106 can control whether or not the key switch is in the on position to enable normal saw operation or in the off position to disable any operation of the saw 10. Alternatively, the supervisor may move the key to the bypass position to enable a single operation of the saw 10 with the guard 70 removed. Once the saw has been stopped, it can not be restarted unless the guard 70 is properly in place or the supervisor reactuates the bypass condition with the key 112. It is an object of the invention to require the overt act of turning the key each time the saw is engaged in the bypass mode so that a supervisor can over look operation of the saw while the guard is moved away from the blade prior to starting.

While there have been shown and described above various embodiments of a power table saw having an interlock safety device in accordance with the invention for the purpose for enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the working surface; and an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface.

2. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the proximity detector, the proximity detector being positioned to detect the predetermined relative proximity only when the guard is positioned in guarding relationship to the cutting tool;

an interlock system coupled to the proximity detector and responding to the detecting of the predetermined relative proximity by the proximity detector, the interlock system preventing use of the power tool when the proximity detector does not detect the predetermined relative proximity between the guard and the proximity detector and enabling use of the power tool when the proximity detector does detect the predetermined relative proximity between the guard and the proximity detector; and an insert having a working surface and an insert aperture extending through the insert in a direction generally perpendicular to the working surface of the insert, the insert being disposed within the aperture through the table with the insert working surface substantially coplanar with the table working surface and with the insert aperture positioned to receive the cutting tool therethrough; and wherein the table has an aperture extending therethrough in a direction generally perpendicular to the working surface.

3. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the working surface, the proximity detector detecting a magnetic field and including at least one permanent magnet permanently attached to the guard and a magnetic field intensity detector disposed beneath the working surface at a detection location opposite the permanent magnet, the magnetic field intensity detector detecting the predetermined relative proximity between the guard and the working surface by detecting a magnetic field intensity at the detection location; and an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface.

4. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the working surface;

an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface; and wherein the power tool further includes a motor coupled to drive the power tool and wherein the interlock system includes a starting circuit coupled to start the motor, the starting circuit being responsive to the proximity detector and starting the motor only when the proximity detector detects the predetermined relative proximity between the guard and the working surface, the starting circuit enabling continued energization of the motor after the motor has been initially started even if the proximity detector does not detect the predetermined relative proximity between the guard and the working surface after the motor has been initially started.

5. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the proximity detector, the Proximity detector being positioned to detect the predetermined relative proximity only when the guard is positioned in guarding relationship to the cutting tool; and an interlock system coupled to the proximity detector and responding to the detecting of the predetermined relative proximity by the proximity detector, the interlock system preventing use of the power tool when the proximity detector does not detect the predetermined relative proximity between the guard and the proximity detector and enabling use of the power tool when the proximity detector does detect the predetermined relative proximity between the guard and the proximity detector, the interlock system including a bypass circuit having a bypass switch having a bypass state and a nonbypass state, the bypass circuit being coupled to selectively allow use of the power tool when the bypass switch is in the bypass state even if the proximity detector does not detect the predetermined relative proximity between the guard and the working surface.

6. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the working surface; and an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface, the interlock system including a bypass circuit having a bypass switch having a bypass state and a nonbypass state, the bypass circuit being coupled to selectively allow use of the power tool when the bypass switch is in the bypass state even if the proximity detector does not detect the predetermined relative proximity between the guard and the working surface, the bypass switch being a key switch allowing an operator to choose between the bypass state and non-bypass state of the bypass switch.

7. A power tool safety device for a power tool having a table defining a working surface, a cutting tool disposed adjacent the working surface with at least a portion of the cutting tool extending above the working surface and a guard moveably disposed adjacent the working surface, the guard being a self adjusting hood that makes continuous contact against either the table working surface or a work piece during operation of the power tool and the guard covering the at least a portion of the cutting tool extending above the working surface, the safety device comprising:

a proximity detector detecting a predetermined relative proximity between the guard and the working surface; and an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface.

8. A power tool safety device for a power tool having a table defining a working surface, a cutting tool disposed adjacent the working surface with at least a portion of the cutting tool extending above the working surface and a guard moveably disposed adjacent the working surface, the guard covering the at least a portion of the cutting tool extending above the working surface, the safety device comprising:

a proximity detector detecting a predetermined relative proximity between the guard and the working surface, the proximity detector including at least two permanent magnets permanently mounted on the guard in spaced apart relationship and at least two reed switches, each reed switch permanently disposed beneath the working surface of the table in opposed relationship to a different one of the permanent magnets, the reed switches having a sensitivity to a magnetic field that is selected to cause the reed switches to close when the guard is properly positioned in guarding relationship to the cutting tool; and an interlock system coupled to the proximity detector and responding to the detecting of the predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface, the interlock system including a circuit that is responsive to the at least two reed switches and that disables use of the power tool unless each of the permanently disposed reed switches is closed.

9. A power tool safety device according to claim 8 wherein the interlock system includes a motor start enable circuit connected in series with the at least two reed switches.

10. A power tool safety device according to claim 9 wherein the interlock system includes a key activated bypass circuit having a bypass contact connected in series with the motor start enable circuit and in parallel with the at least two reed switches.

11. A power tool safety device according to claim 10 wherein the interlock system key activated bypass circuit includes a switch contact that is closed upon movement of a key lock to a bypass position and thereafter remains closed only until direct power to the power tool is terminated, the interlock system key activated bypass circuit enabling use of the power tool when the switch contact is closed.

12. A power tool safety device for a power tool having a table defining a working surface, a cutting blade disposed adjacent the working surface and a guard disposed to provide protection from the cutting blade, the safety device comprising:

a proximity detector detecting a predetermined relative proximity between the guard and the working surface; and an interlock system that is responsive to the proximity detector, the interlock system preventing use of the power tool when the proximity detector does not detect the predetermined relative proximity between the guard and the working surface, the interlock system including a circuit coupled to the proximity detector, the circuit enabling use of the power tool when the proximity detector does detect the predetermined relative proximity between the guard and the working surface and enabling continued use of the power tool after use has been initially enabled even if the proximity detector thereafter does not detect the predetermined relative proximity between the guard and the working surface, the interlock system including a bypass circuit having a bypass switch having a bypass state and a nonbypass state, the bypass circuit enabling use of the power tool when the bypass switch is in the bypass state whether or not the proximity detector detects the predetermined relative proximity between the guard and the working surface.

13. A power tool safety device according to claim 12 wherein the table has an aperture extending therethrough in a direction generally perpendicular to the working surface, the power tool safety device further comprising an insert having a working surface and an aperture extending through the insert in a direction generally perpendicular to the working surface of the insert, the insert being disposed within the aperture through the table with the insert working surface substantially coplanar with the table working surface and the insert aperture positioned to receive the cutting blade therethrough.

14. A power tool safety device according to claim 12 wherein the proximity detector detects a magnetic field and includes at least one permanent magnet permanently attached to the guard and a magnetic field intensity detector adapted to be disposed on a side of the table opposite the working surface at a detection location opposite the permanent magnet, the magnetic field intensity detector detecting the predetermined relative proximity between the permanent magnet and the working surface by detecting a magnetic field intensity at the detection location.

15. A power tool safety device according to claim 12 wherein the power tool has a starting circuit and wherein the interlock system is coupled to disable the starting of the power tool by the starting circuit unless the proximity detector detects the relative predetermined proximity between the guard and the working surface.

16. A power tool safety device according to claim 12 wherein the bypass switch is a key switch allowing an operator to choose between the bypass state and nonbypass state of the bypass switch and wherein at least a portion of the proximity detector is located beneath the working surface.

17. A power tool safety device for a power tool having a table defining a working surface, the table having an aperture extending therethrough in a direction generally perpendicular to the working surface and a cutting blade disposed adjacent the working surface, the safety device comprising:

a guard disposed to provide protection from the cutting blade to an operator;

an insert having a working surface disposed in the aperture such that the working surface of the insert is substantially coplanar with the working surface of the table;

a proximity detector located on the insert on a side thereof opposite the working surface of the insert, the proximity detector detecting a predetermined relative proximity between the guard and the proximity detector; and an interlock system coupled to respond to the detecting of the predetermined relative proximity by the proximity detector by enabling use of the power tool when the proximity detector detects the predetermined relative proximity between the guard and the proximity detector and preventing use of the power tool when the proximity detector does not detect the predetermined relative proximity between the guard and the proximity detector.

18. A power tool safety device according to claim 17 further comprising a permanent magnet permanently secured to the guard and wherein the proximity detector includes a magnetically sensitive reed switch secured to the insert on the side opposite the working surface opposite the permanent magnet, the reed switch being closed by the magnetic field of the permanent magnet when the guard is disposed adjacent the working surface of the insert with the magnet that is secured thereto opposite the reed switch.

19. A power tool safety device according to claim 17 further comprising at least one permanent magnet permanently attached to the guard and wherein the proximity detector detects a magnetic field and includes a magnetic field intensity detector adapted to be disposed on a side of the insert opposite the working surface at a detection location opposite to the permanent magnet, the magnetic field intensity detector detecting the predetermined relative proximity between the permanent magnet and the working surface by detecting a magnetic field intensity at the detection location.

20. A power tool safety device according to claim 17 wherein the power tool has a starting circuit coupled to receive an energization signal from the interlock system the starting circuit starting the power tool in response to the received energization signal and wherein the interlock system is coupled to provide the energization signal to the starting circuit, the power tool continuing to operate once started by the starting circuit even if the proximity detector does not detect the predetermined relative proximity between the guard and the proximity detector.

21. A power tool safety device according to claim 17 wherein the interlock system includes a bypass circuit having a bypass switch having a bypass state and a nonbypass state, the interlock system enabling operation of the power tool whether or not the proximity detector detects the predetermined relative proximity when the bypass switch is in the bypass state.

22. A power tool safety device according to claim 21 wherein the bypass switch is a key switch allowing an operator to choose between the bypass state and nonbypass state of the bypass switch.

23. A power tool comprising:
   a table defining a working surface, the table having an aperture extending therethrough;
   a cutting tool disposed within the aperture and extending beyond the working surface;
   an electric motor secured to the table on a side of the table opposite the working surface and coupled to drive the cutting tool;
   a guard disposed above the working surface of the table and protecting an operator from the cutting tool, the guard having a standby position, being movable to accommodate a work piece as the work piece is being cut by the cutting tool and returning to the standby position after cutting of the work piece;
   a proximity detector detecting a predetermined relative proximity between the guard and the working surface; and
   an interlock system coupled to the proximity detector, the interlock system responding to the detecting of the predetermined relative proximity by the proximity detector by enabling energization of the motor when the proximity detector detects the predetermined relative proximity between the guard and the working surface and by preventing energization of the motor when the proximity detector does not detect the predetermined relative proximity between the guard and the working surface, the interlock system including a bypass switch having a bypass position and a nonbypass position, the interlock system enabling energization of the motor whether or not the predetermined relative proximity is detected when the bypass switch is in the bypass position.

24. A power tool according to claim 23 wherein the proximity detector detects a magnetic field and includes at least one permanent magnet permanently attached to the guard and a magnetic reed switch disposed on a side of the table opposite the working surface at a detection location opposite to the permanent magnet, the magnetic reed switch detecting the predetermined relative proximity between the permanent magnet and the working surface by detecting a magnetic field intensity at the detection location.

25. A power tool safety device according to claim 23 wherein the interlock system includes a circuit that enables continued use of the power tool after use has been initially enabled even if the proximity detector detects a loss of the predetermined relative proximity between the guard and the working surface.

26. A power tool safety device according to claim 23 wherein the bypass switch is a key switch that allows an operator having a key for the key switch to selectively move the bypass switch to the bypass position.

27. A power tool safety device for a power tool having a table defining a working surface with an aperture extending through the table and working surface, a cutting blade disposed to extend through the aperture to cut a work piece held against the working surface, an electric motor coupled to rotationally drive the cutting blade and a guide plate disposed on the working surface and having a leg extending through the aperture to a location beneath the table, the safety device comprising:
   a guard disposed to protect an operator from the cutting blade, the guard being movably attached to the guide plate and moving to accommodate a work piece as the work piece is being cut by the cutting blade;
   a proximity detector located near the working surface and detecting a relative proximity between the guard and the working surface, the proximity detector including at least one permanent magnet secured to the guard and at least one magnetic field strength detector disposed beneath the working surface and detecting a magnetic field emanating from the at least one magnet; and
   an interlock circuit responsive to and electrically coupled to the proximity detector, the interlock circuit being coupled to enable energization of the motor when the proximity detector detects the relative proximity between the guard and the working surface and to prevent energization of the motor when the proximity detector does not detect the relative proximity between the guard and the working surface, the interlock circuit being coupled to enable continued energization of the motor after energization has been initially enabled even if the proximity detector no longer detects the relative proximity between the guard and the working surface, the interlock circuit including a key operated bypass switch having a bypass position, the bypass switch being coupled to allow energization of the motor whether or not the proximity detector detects the predetermined proximity when operation of the power tool is initiated while the bypass switch is in the bypass position.

28. A power table saw comprising:

a base;

a table mounted on the base, the table having a generally planar top working surface and having an aperture extending through the table and working surface;

a saw blade extending through the aperture and above the working surface to cut a work piece held against the working surface;

a guard disposed to protect an operator from the saw blade; and a safety device having a proximity detector detecting a predetermined relative proximity between the guard and the working surface and an interlock system coupled to respond to the detecting of a predetermined relative proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface.

29. A power table saw according to claim 28 wherein the interlock system includes a bypass circuit having a bypass switch having a bypass state and a nonbypass state, the bypass state of the bypass switch enabling operation of the power saw whether or not the proximity detector detects the predetermined proximity.

30. A power table saw comprising:

a base a table mounted on the base, the table having a generally planar top working surface and having an aperture extending through the table and working surface;

a saw blade extending through the aperture and above the working surface to cut a work piece held against the working surface;

a guard disposed to protect an operator from the saw blade; and a safety device having a proximity detector detecting a predetermined relative proximity between the guard and the working surface and an interlock system coupled to respond to the detecting of a predetermined relative Proximity by the proximity detector, the interlock system preventing use of the power tool when the proximity detector does not detect the predetermined relative proximity between the guard and the working surface and enabling use of the power tool when the proximity detector does detect the predetermined relative proximity between the guard and the working surface; and a slotted insert made of aluminum disposed within the aperture with the saw blade extending through the slot, the insert having a generally planar working surface and being secured within the aperture with the working surface of the insert substantially coplanar with the working surface of the table.

31. A power table saw comprising:

a base;

a table mounted on the base, the table having a generally planar top working surface and having an aperture extending through the table and working surface;

a saw blade extending through the aperture and above the working surface to cut a work piece held against the working surface;

a guard disposed to protect an operator from the saw blade; and a safety device having a proximity detector detecting a predetermined relative proximity between the guard and the working surface and an interlock system coupled to respond to the detecting of a predetermined relative proximity by the proximity detector, the proximity detector detecting a magnetic field and including at least one permanent magnet permanently attached to the guard and a magnetic field intensity detector permanently attached to the insert on a side of the insert opposite the working surface at a detection location opposite the permanent magnet, the magnetic field intensity detector detecting the predetermined relative proximity between the permanent magnet and the working surface by detecting a magnetic field intensity at the detection location, the interlock system preventing use of the power tool when the proximity detector does not detect the predetermined relative proximity between the guard and the working surface and enabling use of the power tool when the proximity detector does detect the predetermined relative proximity between the guard and the working surface.

32. A power table saw comprising:

a base;

a table mounted on the base, the table having a generally planar top working surface and having an aperture extending through the table and working surface:

a saw blade extending through the aperture and above the working surface to cut a work piece held against the working surface;

a guard disposed to protect an operator from the saw blade; and a safety device having a proximity detector detecting a predetermined relative Proximity between the guard and the working surface and an interlock system coupled to respond to the detecting of a predetermined relative proximity by the proximity detector, the interlock system including a bypass circuit having a bypass switch having a bypass state and a nonbypass state, the bypass switch being a key switch allowing an operator to choose between the bypass state and nonbypass state of the bypass switch, the bypass state of the bypass switch enabling operation of the power saw whether or not the proximity detector detects the predetermined proximity, the interlock system preventing use of the power tool if the key switch is in the nonbypass state when the proximity detector does not detect the predetermined relative proximity between the guard and the working surface and enabling use of the power tool if the key switch is in the nonbypass state when the proximity detector does detect the predetermined relative proximity between the guard and the working surface.

33. A power table saw comprising:

a base:

a table mounted on the base, the table having a generally planar top working surface and having an aperture extending through the table and working surface;

a saw blade extending through the aperture and above the working surface to cut a work piece held against the working surface;

a guard disposed to protect an operator from the saw blade;

a starting circuit; and a safety device having a proximity detector detecting a predetermined relative proximity between the guard and the working surface and an interlock system coupled to respond to the detecting of a predetermined relative Proximity by the proximity detector. the interlock system preventing use of the power tool when the proximity detector does not detect the predetermined relative proximity between the guard and the working surface and enabling use of the power tool when the proximity detector does detect the predetermined relative proximity between the guard and the working surface, and wherein the interlock system is coupled to the starting circuit, disables the starting circuit when the predetermined proximity is not detected and enables continued use of the power table saw after use has been initially enabled even if the proximity detector does not detect the predetermined relative proximity between the guard and the working surface after use of the power table saw has been initially enabled.

34. A power table saw comprising:

a table defining a working surface, the table having an aperture extending therethrough in a direction generally perpendicular to the working surface;

an arbor disposed beneath the table;

a motor mounted on the arbor, the motor having an electric starting circuit to start the motor and a separate power circuit to power the motor;

a cutting blade coupled to be rotationally driven by the motor, the cutting blade being disposed to extend through the aperture;

a guard moveably disposed above the working surface and at least partially covering the cutting blade, the guard protecting an operator from the cutting blade;

an interlock system including a proximity detector detecting a predetermined relative proximity between the guard and the working surface, the proximity detector including at least one permanent magnet permanently attached to the guard and at least one normally open magnetic reed switch disposed on a side of the table opposite the working surface, each reed switch being located at a detection location opposite one of the at least one permanent magnet, each magnetic reed switch having an open state and a closed state and being coupled in series between the electric starting circuit and a power source, each reed switch detecting the predetermined relative proximity between the guard and the working surface by detecting a magnetic field intensity at the reed switch detection location by remaining in the open state when the predetermined relative proximity is not detected and by switching to the closed state when the predetermined relative proximity is detected, the interlock system responding to the state of the at least one reed switch by preventing use of the power table saw when any switch of the at least one magnetic reed switch is in the open state by disconnecting electrical power from the electric starting circuit and enabling use of the power table saw when each of the at least one magnetic reed switch is in the closed state by coupling the power source with the electric starting circuit, the sensitivity of each reed switch to a magnetic field being selected to cause each reed switch to close when the guard is properly positioned in guarding relationship to the cutting blade, the power circuit of the motor being separate from the starter circuit of the motor and being connected to enable continued use of the power table saw after use has been initially enabled and the power table saw has been started even if one of the at least one magnetic reed switch switches to an open state after the power table saw has been started;

a slotted insert disposed within the aperture through the table with the saw blade extending through the slot, the insert having the at least one reed switch secured thereto at a location adjacent to the cutting blade; and a bypass circuit having a key activated bypass switch having a bypass state and a nonbypass state, the bypass circuit responding to the bypass state of the bypass switch by selectively bypassing the interlock system by coupling a power source directly to the starting circuit in response to the bypass state of the bypass switch.

* * * * *